United States Patent
Katayama et al.

(10) Patent No.: US 7,073,321 B2
(45) Date of Patent: Jul. 11, 2006

(54) CONTROLLER FOR INTERNAL COMBUSTION ENGINE

(75) Inventors: Akihiro Katayama, Toyota (JP); Tokiji Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 70 days.

(21) Appl. No.: 10/964,730

(22) Filed: Oct. 15, 2004

(65) Prior Publication Data

US 2005/0081513 A1    Apr. 21, 2005

(30) Foreign Application Priority Data

Oct. 17, 2003   (JP)   ............... 2003-357596

(51) Int. Cl.
*F01N 3/00*    (2006.01)

(52) U.S. Cl. .................. 60/284; 60/274; 60/277; 60/285

(58) Field of Classification Search .............. 60/274, 60/276, 277, 284, 285, 286
See application file for complete search history.

(56) References Cited

U.S. PATENT DOCUMENTS 5,261,230 A * 11/1993 Yuuki et al. ............ 60/276
5,271,223 A * 12/1993 Hoshi .................... 60/276
5,950,419 A * 9/1999 Nishimura et al. ........... 60/274
6,513,322 B1 * 2/2003 Ohuchi et al. ............ 60/285
6,829,886 B1 * 12/2004 Nakata ................. 60/277
6,945,222 B1 * 9/2005 Kluzner et al. ......... 123/339.15

FOREIGN PATENT DOCUMENTS

| JP | 07-208153 | 8/1995 |
|---|---|---|
| JP | 2001-132438 | 5/2001 |
| JP | 2003-120382 | 4/2003 |
| JP | 2003-120408 | 4/2003 |
| JP | 2003-138967 | 5/2003 |

* cited by examiner

*Primary Examiner*—Binh Q. Tran
(74) *Attorney, Agent, or Firm*—Kenyon & Kenyon LLP

(57) ABSTRACT

A controller for an internal combustion engine that accurately diagnoses heating control of a catalytic device as having or not having an abnormality. The controller increases speed of the engine during engine idle to accelerate heating of the catalytic device with exhaust gas discharged from the engine. The controller obtains a total intake air amount by adding up the amount of air that has been supplied to the engine in a predetermined period during execution of the heating control. The controller determines that the heating control has an abnormality when the total intake air amount is less that a total air amount determination value.

26 Claims, 9 Drawing Sheets

CONTROLLER FOR INTERNAL COMBUSTION ENGINE

BACKGROUND OF THE INVENTION

The present invention relates to a controller for use in an internal combustion engine to execute heating control for increasing the idle speed of the internal combustion engine and accelerating heating of a catalytic device, and more particularly, to a controller for determining whether the heating control has an abnormality.

An exhaust system of an internal combustion engine includes a catalytic device for purifying exhaust. The catalytic device for purifying exhaust exerts its purification function when heated to a predetermined activation temperature. As one example, Japanese Laid-Open Patent Publication No. 2001-132438 discloses a controller for an internal combustion engine, which executes heating control of a catalytic device. When the temperature of the catalytic device is low, for example, immediately after starting the engine, the controller increases the temperature of the exhaust gas by retarding the ignition timing, or increases the flow of exhaust gas by increasing the idle speed of the engine. Such heating control that increases the temperature or the flow of exhaust, which is supplied to the catalytic device, accelerates heating of the catalytic device. With such heating control, the catalytic device is activated quickly.

The controller disclosed in the above document adds up the amount of intake air that has been supplied to the engine after start of the heating control to obtain a total intake air amount. The temperature of the catalytic device is detected when the total intake air amount reaches a determination value, which is set in advance. If the detected temperature is below the activation temperature of the catalytic device, the controller diagnoses abnormalities in the heating control, such as insufficient retarding of the ignition timing and insufficient increase of the idle speed. The total amount of intake air that is required to heat the catalytic device to a temperature greater than or equal to the activation temperature during normal execution of the heating control is calculated in advance. The calculated total amount is set as the determination value. The time required from when the heating control is started to when the catalytic device reaches the activation temperature varies depending on the operation status of the engine during execution of the heating control. As described above, the controller sets the timing for diagnosing the heating control by using the total intake air amount. In this way, the controller appropriately diagnoses the heating control as having or not having an abnormality regardless of changes in the operation status of the engine.

When the heating control to increase the idle speed is executed, activation of the catalytic device may be delayed by an abnormality occurring in an intake air amount adjusting mechanism, namely, an idle speed control valve or a throttle valve. For example, the abnormality may be such that the valve is fixed and cannot be opened wider than it should be. In this case, the amount of intake air during the idle operation fails to be increased sufficiently. If this happens, the flow of exhaust gas fails to be increased sufficiently. As a result, heating of the catalytic device is decelerated.

The conventional controller fails to accurately diagnose the heating control of the catalytic device as having such an abnormality that is caused by an insufficient increase in the intake air amount. With the above conventional abnormality diagnosis, a long time is required by the total intake air amount to reach the determination value when the intake air amount fails to be sufficiently increased during the heating control. When the heating of the catalytic device is decelerated due to insufficient increase in the intake air amount, the heating of the catalytic device continues for a long time before the heating control diagnosis is executed. In such a case, the temperature of the catalytic device reaches the activation temperature by the time the diagnosis is executed. Thus, the heating control may be erroneously diagnosed as being normal even though the heating speed includes an abnormality.

SUMMARY OF THE INVENTION

The present invention provides a controller for an internal combustion engine, which accurately diagnoses heating control of a catalytic device as having or not having an abnormality.

One aspect of the present invention is a controller for an internal combustion engine including a catalytic device. Heating control means increases speed of the engine during engine idle to accelerate heating of the catalytic device with exhaust gas discharged from the engine. Diagnosis means obtains a total air amount by adding up an amount of air that has been supplied to the engine in a predetermined period during execution of the heating control and determines that the heating control has an abnormality when the total air amount is less than an air amount determination value.

Another aspect of the present invention is a control apparatus for an internal combustion engine including a catalytic device. A controller increases speed of the engine during engine idle to accelerate heating of the catalytic device with exhaust gas discharged from the engine. The controller obtains a total air amount by adding up an amount of air that has been supplied to the engine in a predetermined period during execution of the heating control and determines that the heating control has an abnormality when the total air amount is less than an air amount determination value.

A further aspect of the present invention is a controller for an internal combustion engine that executes heating control for increasing speed of the engine during engine idle to accelerate heating of a catalytic device with exhaust gas discharged from the engine. A sensor detects air being supplied to the engine. Diagnosis means is in communication with the sensor. The diagnosis means obtains a total air amount by adding up the amount of air that has been supplied to the engine in a predetermined period during execution of the heating control and determines that the heating control has an abnormality when the total air amount is less than an air amount determination value.

A further aspect of the present invention is a control apparatus for an internal combustion engine that executes heating control for increasing speed of the engine during engine idle to accelerate heating of a catalytic device with exhaust gas discharged from the engine. A sensor detects air being supplied to the engine. A controller is in communication with the sensor. The controller obtains a total air amount by adding up the amount of air that has been supplied to the engine in a predetermined period during execution of the heating control and determines that the heating control has an abnormality when the total air amount is less than an air amount determination value.

A further aspect of the present invention is a method for diagnosing heating control that increases speed of an internal combustion engine during engine idle and accelerates heating of a catalytic device with exhaust gas discharged from the engine. The method including obtaining a total air amount by adding up an amount of air that has been supplied to the engine in a predetermined period during execution of the heating control, and comparing the total air amount with an air amount determination value and determining that the heating control has an abnormality when the total air amount is less than the air amount determination value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

[First Embodiment]

The following describes a controller 50 for an internal combustion engine according to a first embodiment of the present invention with reference to FIGS. 1 to 8.

Figure 1:
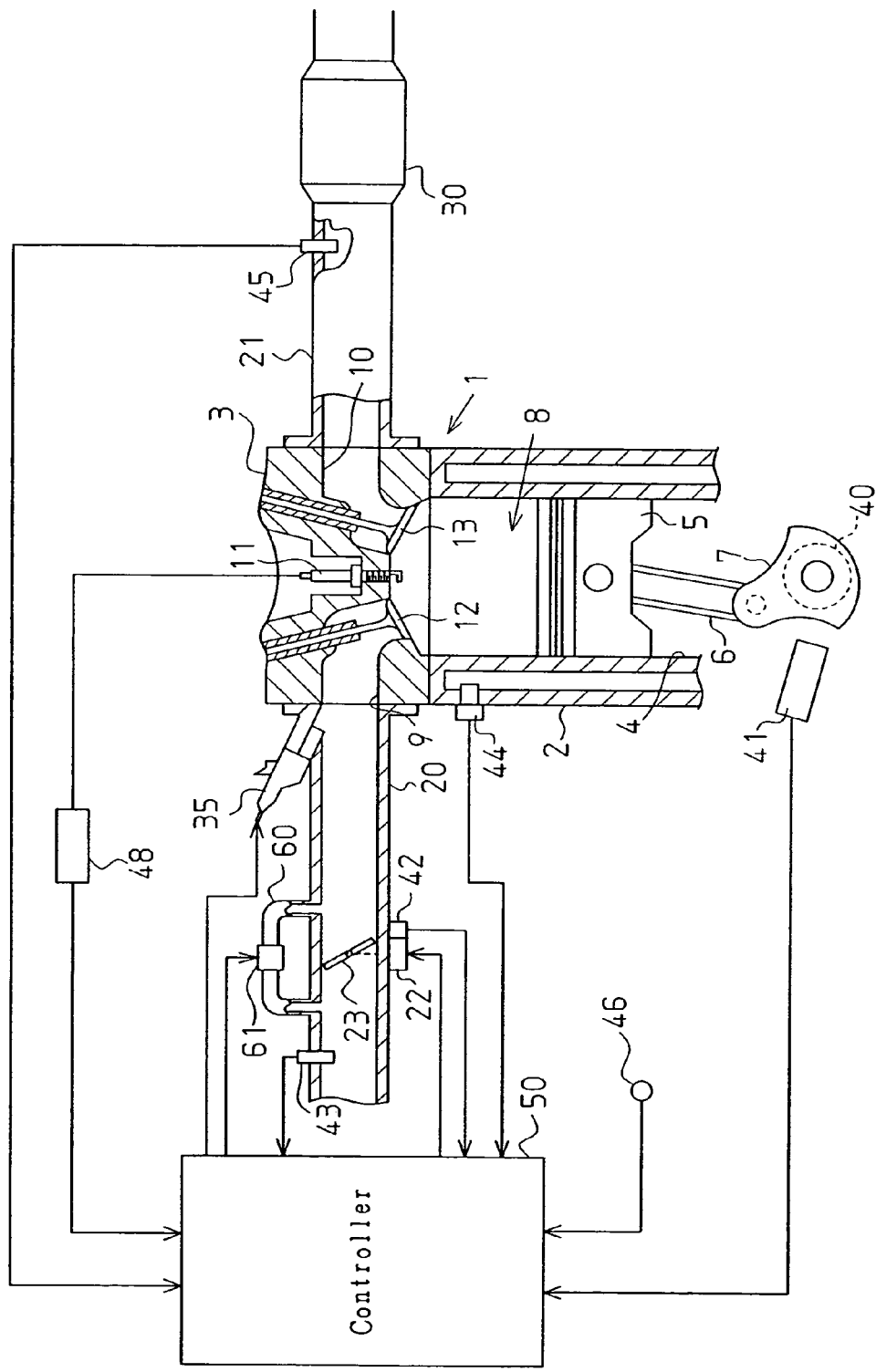
FIG. 1 is a schematic diagram of an internal combustion engine and a controller according to a first embodiment of the present invention.

FIG. 1 is a schematic diagram showing a gasoline engine 1 to which the controller 50 is applied and its peripheral components.

The gasoline engine 1 has a plurality of cylinders. In a cylinder block 2 of the gasoline engine 1, a plurality of cylinders 4 are arranged (only one cylinder is illustrated in FIG. 1 for the sake of simplicity). A piston 5 is arranged in the cylinder 4. The piston 5 is linked to a crankshaft 7, which functions as an engine output shaft, by a connection rod 6.

A cylinder head 3 is mounted on top of the cylinder block 2. In the cylinder 4, a combustion chamber 8 is defined between an upper end of the piston 5 and the cylinder head 3. In the cylinder head 3, an ignition plug 11 is arranged for each cylinder to ignite an air-gas mixture in the combustion chamber 8.

The cylinder head 3 has an intake port 9 and an exhaust port 10 for each cylinder. The intake port 9 functions as an intake passage leading into the associated combustion chamber 8. The exhaust port 10 functions as an exhaust passage leading out of the associated combustion chamber 8. An intake valve 12 is arranged in the intake port 9 to open and close the intake port 9. An exhaust valve 13 is arranged in the exhaust port 10 to open and close the exhaust port 10. A fuel injection valve 35 is arranged for each cylinder. The fuel injection valve 35 injects fuel into the associated intake port 9.

The intake port 9 is connected to an intake passage 20. The exhaust port 10 is connected to an exhaust passage 21. An actuator 22, which is driven based on the operation of the accelerator pedal, is connected to the intake passage 20. A throttle valve 23, whose opening degree is adjusted by the actuator 22, is arranged in the intake passage 20. The amount of air supplied into the combustion chamber 8 is adjusted by changing the opening degree of the throttle valve 23.

The intake passage 20 has a bypass passage 60, which allows intake air supplied into the combustion chamber 8 to bypass the throttle valve 23. An ISC valve 61 is arranged in the bypass passage 60. The opening degree of the ISC valve 61 is controlled to adjust the amount of air passing through the bypass passage 60 to regulate the amount of intake air during idle. The ISC valve 61 forms an intake air amount adjusting mechanism.

A catalytic device 30 provided with an exhaust purification function is arranged on the exhaust passage 21. When the temperature of the catalytic device 30 reaches a high predetermined value, the catalytic device 30 is activated and purifies exhaust gas containing hydrocarbon (HC), carbon monoxide (CO), and nitrogen oxide (NOx).

The gasoline engine 1 includes various sensors for detecting the operation status of the engine. For example, a crank rotor 40, which rotates integrally with the crankshaft 7, is arranged on the crankshaft 7. An engine speed sensor 41 for detecting rotation speed of the crankshaft 7, i.e., engine speed NE, is arranged near the crank rotor 40. A throttle opening degree sensor 42 for detecting the opening degree TA of the throttle valve 23 (throttle opening degree TA) is arranged near the throttle valve 23. An air flow meter 43 for detecting an amount of air supplied into the combustion chamber 8, or an intake air amount GA, is arranged upstream of the throttle valve 23. A coolant temperature sensor 44 for detecting coolant temperature THW is arranged in the cylinder block 2. An air-fuel ratio sensor 45 for detecting the concentration of oxygen in the exhaust gas is arranged on the exhaust passage 21. A starter switch 46 outputs an ON signal when a starter motor for starting the engine is operating, and outputs an OFF signal when the starter motor is not operating.

The controller 50 for the gasoline engine 1 executes various controls on the gasoline engine 1, such as ignition timing control and fuel injection control. The controller 50 includes a microcomputer having a central processing unit (CPU). As one example, the controller 50 includes a read only memory (ROM) prestoring various programs and maps, a random access memory (RAM) for temporarily storing operation results of the CPU, a timer counter, an input interface, and an output interface.

The input interface of the controller 50 is connected to the engine speed sensor 41, the throttle opening degree sensor 42, the air flow meter 43, the coolant temperature sensor 44, and the air-fuel ratio sensor 45. These various sensors detect the operation status of the gasoline engine 1. The controller 50 receives output signals from the sensors 41 to 45 via the input interface.

The output interface of the controller 50 is connected to the fuel injection valve 35, an ignition coil 48 for applying a high voltage to the ignition plug 11, the actuator 22 of the throttle valve 23, and the ISC valve 61, via corresponding drive circuits. Based on the signals received from the various sensors, the controller 50 controls the fuel injection valve 35, the ignition coil 48, the actuator 22, and the ISC valve 61 according to control programs and control data stored in its ROM.

The controller 50 sets basic ignition timing IGNb based on the engine speed NE and engine load, which is calculated from the intake air amount GA and the throttle opening degree TA. Further, the controller 50 corrects the basic ignition timing IGNb using a correction value calculated based on knock control, the engine operation status, etc., and calculates a final ignition timing IGNf.

The controller 50 executes idle control, for adjusting the opening degree of the ISC valve 61, to adjust the engine speed during idle of the gasoline engine 1 (hereafter referred to as an "idle speed INE") to a predetermined target idle speed ITNE. To be specific, the controller 50 first sets a basic drive command value ISCb of the ISC valve 61, which corresponds to the target idle speed ITNE. The controller 50 then corrects the basic drive command value ISCb according to a difference $\Delta$NE between the actual idle speed INE and the target idle speed ITNE to set a final drive command value ISCt. The opening degree of the ISC valve 61 is adjusted based on the final drive command value ISCt. Hereafter, the processing for calculating the drive command value ISCt based on the difference $\Delta$NE is referred to as "ISC learning". The ISC learning is once completed when the drive command value ISCt, which is used to adjust the idle speed INE to the target idle speed ITNE, is calculated. The ISC learning corresponds to a learning means.

The temperature of the catalytic device 30 is low during a cold start of the gasoline engine 1, or immediately after start of the gasoline engine 1 when it is not sufficiently warmed. The catalytic device 30 at such low temperatures fails to fully exert its exhaust purification function. In the first embodiment, to enable the catalytic device 30 to be activated at an early stage immediately after start of the engine, the controller 50 executes heating control that involves retarding the ignition timing and increasing of the amount of exhaust gas by increasing the idle speed INE.

To retard the ignition timing, the controller 50 corrects the final ignition timing IGNf using a retard correction amount, which is calculated, based on the coolant temperature THW when the engine is started. This retard correction sets the final ignition timing IGNf at such a value that represents an ignition timing retarded from when the heating control is not executed. As a result, the temperature of the exhaust increases, and the catalytic device 30 is quickly activated.

To increase the idle speed INE from that during normal idle, the controller 50 increases the intake air amount GA by controlling the opening degree of the ISC valve 61. The controller 50 sets the target idle speed ITNE and the basic drive command value ISCb, based on the warming status of the internal combustion engine, that is, based on the coolant temperature THW, which has a correlation with the temperature status of the catalytic device 30. To be specific, the controller 50 sets the target idle speed ITNE and the basic drive command value ISCb at larger values for lower coolant temperatures THW. In this way, by setting the idle speed INE and the intake air amount GA at larger values for lower coolant temperatures THW (intake air amount increase control), the amount of exhaust increases and the catalytic device 30 is quickly activated. The processing for setting the basic drive command value ISCb based on the coolant temperature THW, which has a correlation with the temperature status of the catalytic device 30, corresponds to a setting means. The basic drive command value ISCb set in this way is also corrected through the ISC learning.

When an abnormality occurs in the intake air amount increase control described above, the catalytic device 30 may not be heated sufficiently. In view of this, the controller 50 of the first embodiment includes a diagnosis means for diagnosing the heating control as having or not having an abnormality, which is caused by an abnormality occurring in the intake air amount increase control. The following describes the heating control diagnosis process with reference to FIGS. 2 to 8.

Figure 2:
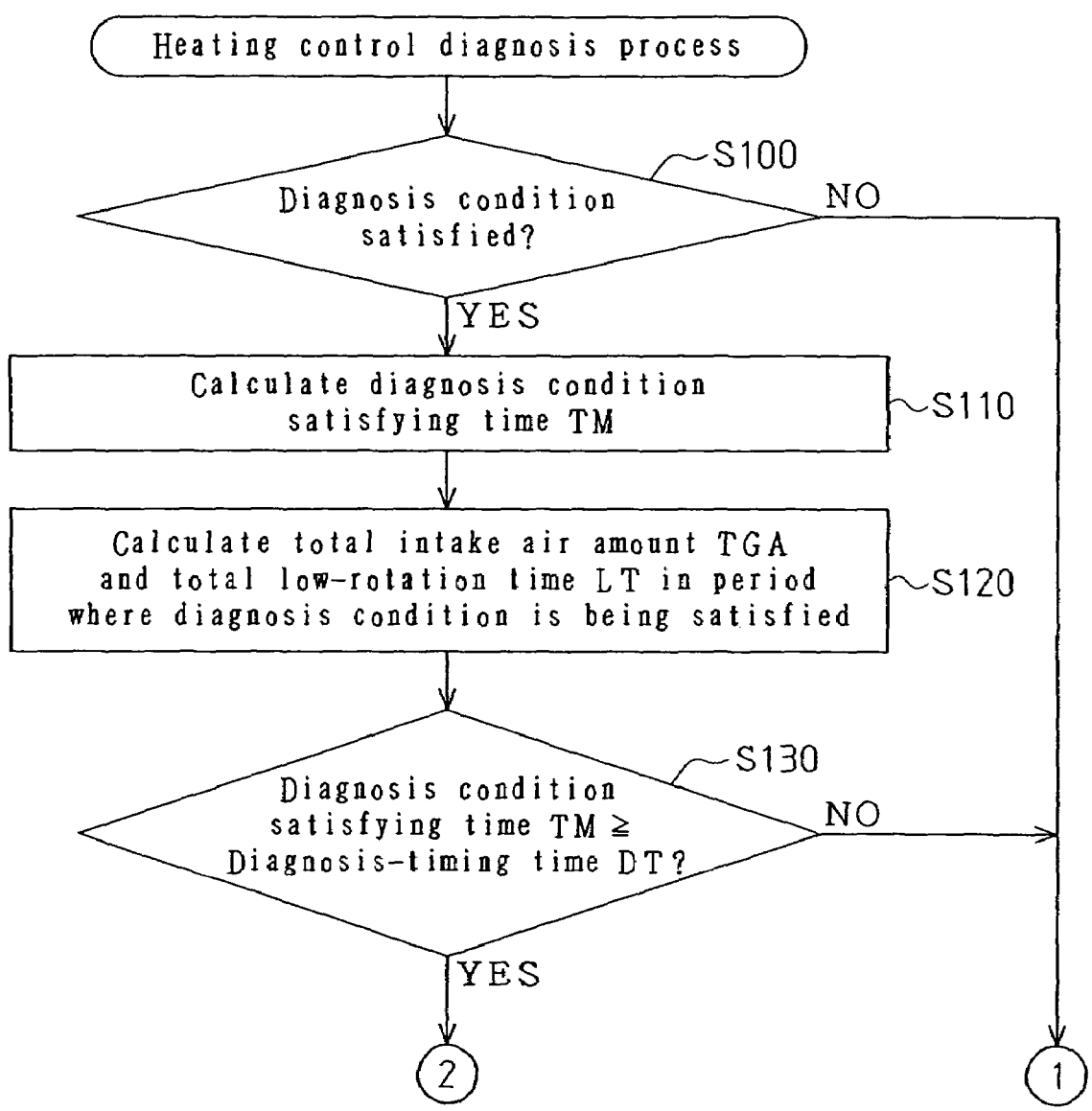
FIG. 2 is a flowchart showing a heating control diagnosis-process executed by the controller of FIG. 1.

FIG. 2 shows the heating control diagnosis process, which is executed by the controller 50. The controller 50 repeatedly executes the diagnosis process every predetermined time after the engine is started.

When the diagnosis process is started, the controller 50 first determines whether a diagnosis condition for starting a diagnosis is satisfied (S100). In the first embodiment, the controller 50 determines that the diagnosis condition is satisfied when predetermined conditions such as conditions (a1) to (a10) described below are all satisfied.

(a1): The engine has been started.

(a2): The starter signal is an OFF signal.

(a3): The coolant temperature THW is in a predetermined range (e.g., in a range of $-10$ to $50°$ C.).

(a4): The total amount of intake air that has been supplied to the engine in a period from when the engine was started to when the processing in S100 was executed is less than or equal to a predetermined amount (e.g., 1000 g).

(a5): The vehicle is not moving (e.g., the vehicle velocity is less than or equal to 5 km/h).

(a6): When the vehicle has an automatic transmission gear, one second or more has elapsed from when the shift lever position was shifted from a neutral position N to a drive position D or from the drive position D to the neutral position N.

(a7): The ISC learning has been completed. Alternatively a predetermined time (e.g., 40 seconds) has elapsed from when the ISC learning was started, and the ISC learning is expected to be completed.

(a8): Conditions (a8-1) and (a8-2) described below are satisfied.

(a8-1): A predetermined time (e.g., three seconds) has elapsed from when the idle control was started.

(a8-2): A predetermined time (e.g., two seconds) has elapsed from when the engine recovered from a fuel-cut state.

(a9): Condition (a9-1) or (a9-2) described below is satisfied.

(a9-1): The engine speed exceeds a predetermined speed (e.g., 1000 rpm) after a predetermined time (e.g., three seconds) has elapsed from when the engine was started.

(a9-2) A predetermined time (e.g., five seconds) has elapsed from when the engine was started.

(a10): Condition (a10-1) or (a10-2) described below is satisfied.

(a10-1): The battery voltage is greater than or equal to a predetermined value (e.g., 11 V).

(a10-2) The battery voltage is greater than or equal to a predetermined value (e.g., 8 V), which is smaller than the above predetermined value (e.g., 11 V), during a period from when the engine was started to when a predetermined time has elapsed (e.g., five seconds).

The intake air amount increase control is executed after the engine is started. Thus, condition (a1) is set.

The engine speed NE is excessively low when the starter is operating. In this case, the intake air amount fails to increase normally. Thus, condition (a2) is set.

The diagnosis process diagnoses the heating control of the catalytic device 30 as having or not having an abnormality. This means that the diagnosis process needs to be executed before heating of the catalytic device 30 is completed. To determine whether heating of the catalytic device 30 has been completed, conditions (a3) and (a4) are set.

The intake air amount and the engine speed increase more when the vehicle is moving than when the intake air amount increase control is executed. When the vehicle is moving, the diagnosis is not executed correctly. Thus, condition (a5) is set.

When the shift lever position for a vehicle having an automatic transmission gear is switched to change the status of the transmission gear, the engine load changes. Further, the engine speed temporarily changes. Thus, condition (a6) is set.

Whether the intake air amount is correctly adjusted cannot be determined when the ISC learning is not completed. Thus, condition (a7) is set. When the ISC valve 61 has a failure, the ISC learning is not completed, and the diagnosis process is not started. Assuming that the ISC learning is expected to be completed in a predetermined period after the ISC learning is started, condition (a7) is set. Such an abnormality in the heating control, which is caused by a failure in the ISC valve 61, is detected by the diagnosis process.

The engine speed is not set at a value required for the intake air amount increase control when control for setting the engine speed at a value required for recovery from a fuel-cut state is executed. Also, the engine speed is not stabilized immediately after the idle control is started. For such reasons, condition (a8) is set. When, for example, the driver deeply depresses the accelerator pedal until the engine speed reaches a value at which "fuel cut" for cutting the supply of fuel to the engine is executed, the engine enters a fuel-cut state at the point of time the engine is started.

To enable the execution of the diagnosis when the engine speed has been sufficiently increased, and to prevent erroneous diagnosis due to a temporal increase in the engine speed immediately after the starting of the engine, condition (a9-1) is set. When the engine speed is temporarily hindered from increasing after the starting of the engine, condition (a9-1) is not satisfied. In this case, the frequency of the diagnosis conditions being satisfied, in other words, the frequency of the heating control being diagnosed (diagnosis frequency) decreases. To increase the diagnosis frequency, condition (a9-2) is set.

When the battery voltage is excessively low, the operation status of the engine becomes unstable because of a weak ignition of the ignition plug, etc. Thus, condition (a10-1) is set. Further, the battery voltage may be temporarily lowered immediately after the starting of the engine. Thus, to increase the frequency of the diagnosis conditions being satisfied, in other words, to increase the diagnosis frequency, condition (a10-2) is set.

When the diagnosis condition is not satisfied ("NO" in S100), the diagnosis process is temporarily terminated.

When the diagnosis condition is satisfied ("YES" in S100), the cumulative measuring of the diagnosis condition satisfaction time TM, which is the total time the diagnosis conditions are satisfied, is started (S110). A timer counter in the controller 50 accumulates the diagnosis condition satisfaction time TM.

Next, the controller 50 calculates the total intake air amount TGA and the total low-speed time LT during a period in which the diagnosis conditions are satisfied (S120). The controller 50 calculates the total intake air amount TGA by adding up the value of the intake air amount GA, which is detected by the air flow meter 43, at every predetermined time. The controller 50 calculates the total low-speed time LT by adding up the time where the idle speed INE is maintained below the target idle speed ITNE by a predetermined amount, i.e., the time where the present exhaust amount is maintained below the exhaust gas amount at the target idle speed. The total low-speed time LT is calculated as a total time where conditional expression (1) described below is satisfied.

$$\text{target idle speed ITNE} - \text{actual idle speed INE} \geq \text{predetermined value } \alpha \quad \text{conditional expression (1):}$$

In the first embodiment, the total time in which the idle speed INE is kept less than or equal to a threshold $\beta$ is calculated as the total low-speed time LT based on conditional expression (2) described below, which is obtained by modifying conditional expression (1).

$$\text{actual idle speed INE} \leq \text{threshold } \beta \text{ (threshold } \beta = \text{target idle speed ITNE} - \text{predetermined value } \alpha \text{) conditional expression (2):}$$

Figure 5:
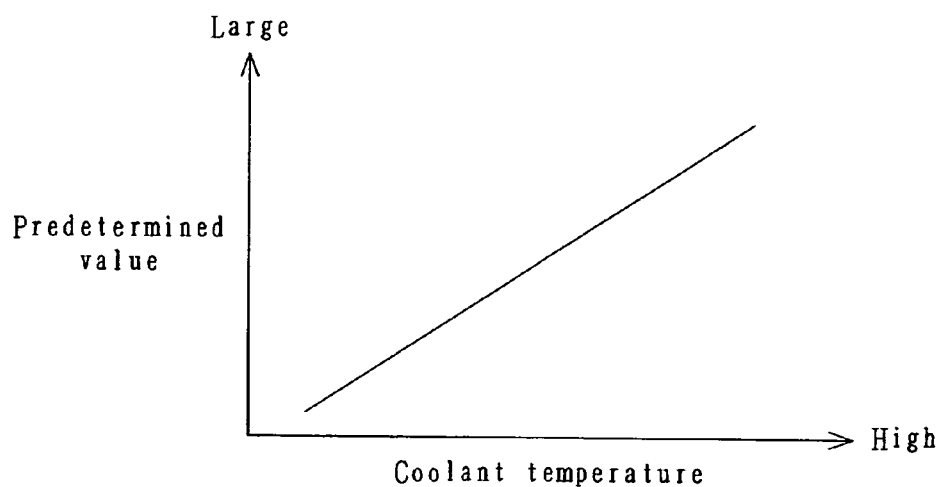
FIG. 5 is a graph showing the relationship between a predetermined value and a coolant temperature in the first embodiment.

The controller 50 sets the predetermined value $\alpha$ to detect a difference between the idle speed INE and the target idle speed ITNE. Further, the controller 50 sets the predetermined value $\alpha$ to detect whether the minimum engine speed that is required to heat the catalytic device 30 has been reached. Even when the amount of heat received by the catalytic device 30 is reduced by a decrease in the amount of exhaust, that is, even when, for example, the difference between the idle speed INE and the target idle speed ITNE is large, there is no problem if the temperature of the catalytic device 30 is high. In other words, even when the idle speed INE is low, its adverse influence is small if the temperature of the catalytic device 30 is high. In the first embodiment, the controller 50 variably sets the predetermined value $\alpha$ based on the coolant temperature THW, which has a correlation with the temperature of the catalytic device 30. By doing so, the threshold $\beta$, which is used to calculate the total low-speed time LT for monitoring the heating status of the catalytic device 30, is variably set according to the temperature status of the catalytic device 30. To be specific, the predetermined value $\alpha$ is set at a larger value as the coolant temperature THW is higher as shown in FIG. 5.

In the first embodiment, the controller 50 calculates the threshold $\beta$ as a value obtained by subtracting the predetermined value $\alpha$ from the target idle speed ITNE. Thus, the threshold $\beta$ changes according to changes in the target idle speed ITNE. The target idle speed ITNE is set based on a parameter indicating the engine status, such as the coolant temperature THW. This enables the controller 50 to appropriately calculate the total low-speed time.

Next, the controller 50 determines whether the diagnosis condition satisfaction time TM has reached the diagnosis-timing time DT, which is set in advance (S130). In the first embodiment, the diagnosis-timing time DT is set at ten seconds. However, the diagnosis-timing time DT is not limited to ten seconds and may be set to another value. When the diagnosis condition satisfaction time TM is less than the diagnosis-timing time DT ("NO" in S130), the diagnosis process is temporarily terminated and the diagnosis condition satisfaction time TM continues being accumulated.

Figure 3:
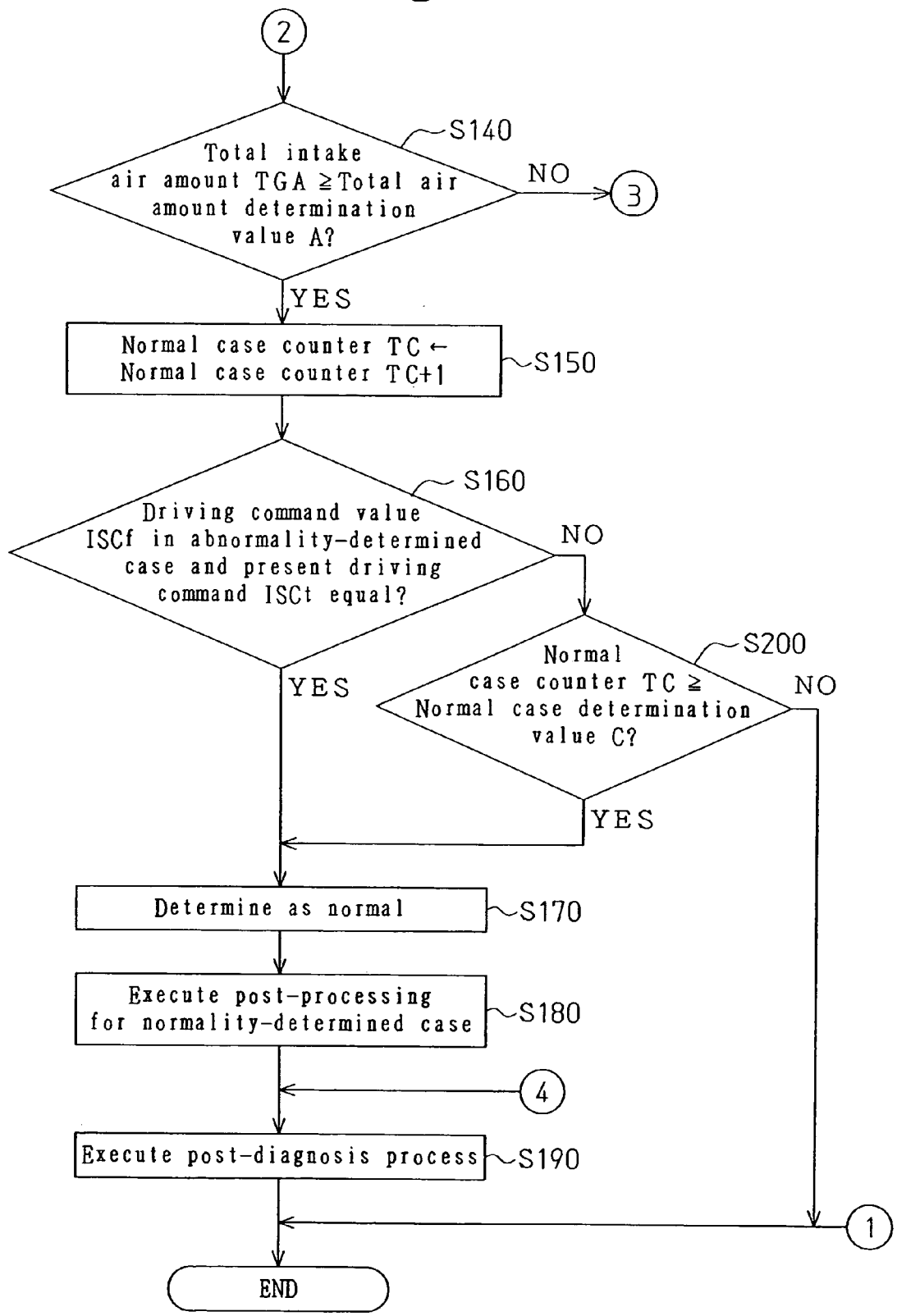
FIG. 3 is a flowchart showing the heating control diagnosis process executed by the controller of FIG. 1.

When the diagnosis condition satisfaction time TM is greater than or equal to the diagnosis-timing time DT ("YES" in S130), the controller 50 determines whether the total intake air amount TGA in the diagnosis-timing time DT is greater than or equal to the total air amount determination value A (S140 in FIG. 3). A period from when the diagnosis condition is satisfied to when the diagnosis-timing time DT elapses corresponds to the "predetermined period set in advance". The total air amount determination value A corresponds to a total amount of intake air in the diagnosis-timing time DT when the ISC valve 61 has an opening degree that is sufficient for obtaining the amount of intake air that is required to heat the catalytic device 30, that is, when the intake air amount increase control is executed normally.

When the total intake air amount TGA in the diagnosis-timing time DT (i.e., in the predetermined period set in advance) during idle at execution of the heating control is small, the amount of exhaust that comes in contact with the catalytic device 30 per unit time is small, and the heating speed of the catalytic device 30 is slow. When the total intake air amount TGA in the diagnosis-timing time DT is large, the amount of exhaust that comes in contact with the catalytic device 30 per unit time is large, and the heating speed of the catalytic device 30 is fast. In this way, the total intake air amount TGA in the predetermined period set in advance during idle operation at execution of the heating control is an index value, which accurately reflects the degree of heating of the catalytic device 30 by the heating control. The controller 50 compares the total intake air amount TGA with the total air amount determination value A. By doing so, the controller 50 accurately diagnoses the heating control of the catalytic device 30 as having or not having an abnormality, which is caused by an insufficient increase in the intake air amount during idle at execution of the heating control. In other words, the controller 50 accurately determines whether the catalytic device 30 is appropriately heated by the heating control.

Figure 6:
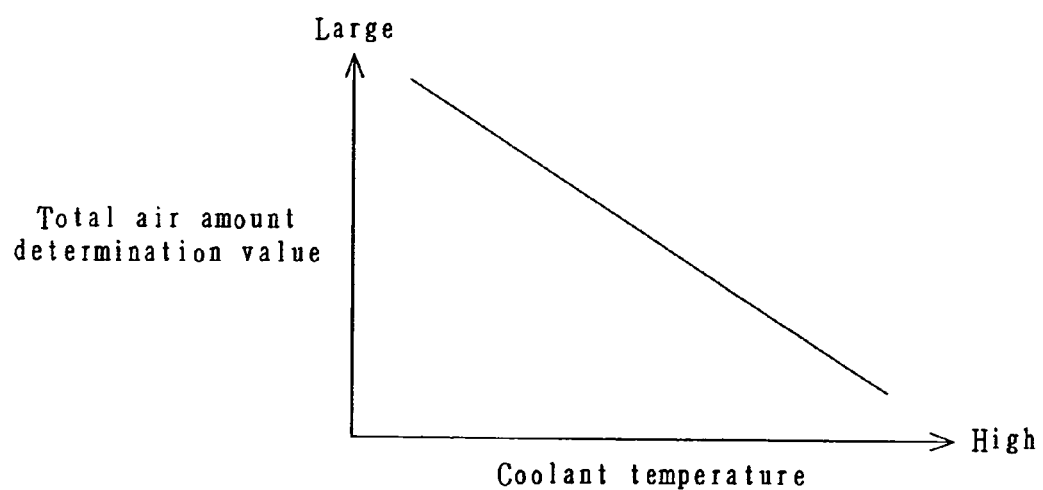
FIG. 6 is a graph showing the relationship between a total air amount determination value and a coolant temperature in the first embodiment.

The basic drive command value ISCb of the ISC valve 61 is set according to the coolant temperature THW. Even when the total intake air amount TGA is small, its adverse influence is small if the temperature of the catalytic device 30 is high. Thus, the total air amount determination value A for determining the heating status of the catalytic device 30 is variably set based on the coolant temperature THW. To be specific, the total air amount determination value A is set at a smaller value as the coolant temperature THW increases as shown in FIG. 6.

When the total intake air amount TGA is greater than or equal to the total air amount determination value A ("YES" in S140), the controller 50 determines that the ISC valve 61 is set to have an opening degree sufficient for obtaining the amount of intake air that is required to heat the catalytic device 30. That is, the intake air amount increase control is determined as being executed normally. Following this, a normal case counter TC is incremented (S150). The initial value of the normal case counter TC is set at 0.

Next, the controller 50 determines whether a difference between the presently set drive command value ISCt and a drive command value ISCf set when the heating control was determined as having an abnormality (abnormality-determined case drive command value ISCf) is greater than or equal to a predetermined value, that is, whether the abnormality-determined case drive command value ISCf and the presently set drive command value ISCt are substantially equal (S160). This determination is made based on conditional expression (3) described below. When conditional expression (3) is satisfied, the difference between the drive command value ISCt and the abnormality-determined case drive command value ISCf is less than the predetermined value, and the two values are determined as being substantially equal. When conditional expression (3) is not satisfied, the difference between the drive command value ISCt and the abnormality-determined case drive command value ISCf is greater than or equal to the predetermined value, and the two values are determined as not being equal. The abnormality-determined case drive command value ISCf is set by the processing in S230 shown in FIG. 4. The drive command value ISCt of the ISC valve 61 set when the heating control was previously determined as having an abnormality is stored as the abnormality-determined case drive command value ISCf in the RAM of the controller 50. An initial value of the abnormality-determined case drive command value ISCf is set at 0.

$$ISCf*\text{minimum coefficient } L \leq \text{drive command value}$$
$$ISCt < ISCf*\text{maximum coefficient H} \quad \text{conditional expression (3):}$$

In the first embodiment, the minimum coefficient L is set at 0.7 and the maximum coefficient H is set at 1.3. However, the minimum coefficient L and the maximum coefficient H may be changed when required. Conditional expression (3) only needs to enable the determination as to whether the abnormality-determined case drive command value ISCf and the drive command value ISCt, which is set in a diagnosis of the heating control executed again (second-diagnosis drive command value ISCt), are substantially equal. Another conditional expression may be set when required.

The processing in S160 is executed for the following reasons. The drive command value of the ISC valve 61 is variably set based on the coolant temperature THW, which has a correlation with the temperature of the catalytic device 30. When the drive command value is variably set in this way, a certain drive command value may cause the heating control to be diagnosed as having an abnormality, and another drive command value may cause the heating control to be diagnosed as not having an abnormality. In a first diagnosis with a specific drive command value being set, the heating control may be diagnosed as having an abnormality. Then, in a second diagnosis with a drive command value different from the specific drive command value being set, the heating control may be diagnosed as not having an abnormality. Here, the abnormality determined in the first diagnosis may not necessarily have been removed at the time of the second diagnosis. For example, the abnormality determined in the first diagnosis may depend on the drive command value of the ISC valve 61. In this case, even if the second diagnosis with the different drive command value diagnoses the heating control as not having an abnormality, a third diagnosis executed again with the specific drive command value may diagnose the heating control as having an abnormality again.

In the first embodiment, when the heating control is diagnosed as having an abnormality in a first diagnosis and as not having an abnormality in a second diagnosis, the controller 50 maintains the first diagnosis result as having an abnormality when the drive command value set in the first diagnosis greatly differs from the drive command value set in the second diagnosis. In other words, the controller 50 assumes that the abnormality determined in the first diagnosis has been removed only when the drive command value set in the second diagnosis is substantially equal to the drive command value set in the first diagnosis. In this way, the controller 50 avoids diagnosing the heating control as not having an abnormality when not recognizing whether an abnormality determined previously has been eliminated.

When the abnormality-determined case drive command value ISCf and the second-diagnosis drive command value ISCt are determined as being substantially equal by the processing in S160 ("YES" in S160), the controller 50 finally determines that the processing for increasing the intake air amount by the intake air amount increase control is executed normally, and that the heating control does not have an abnormality (S170).

When the abnormality-determined case drive command value ISCf and the second-diagnosis drive command value ISCt are determined as not being substantially equal by the processing in S160 ("NO" in S160), the controller 50 determines whether the present value of the normal case counter TC is greater than or equal to a normal case determination value C (S200). In the first embodiment, the normal case determination value C is set at three. However, the normal case determination value C may be changed when required. When the heating control was previously determined as having an abnormality, the controller 50 executes the processing in S200 while maintaining the previous determination result.

The processing in S200 is executed for the following reasons. The basic drive command value ISCb, on which the drive command value ISCt is based, is set based on the coolant temperature THW. To equalize the abnormality-determined case-drive command value ISCf and the second-diagnosis drive command value ISCt, the coolant temperature THW in the previous diagnosis where the heating control was determined as having an abnormality needs to be equal to the coolant temperature THW in the present diagnosis. The coolant temperature THW is influenced by outside air temperature. Conditional expression (3) is not basically satisfied unless the outside air temperature in the previous diagnosis is equal to the outside air temperature in the present diagnosis. Thus, with weather conditions such as outside air temperature being unsatisfied, the processing in S160 may result in a negative determination although the air amount increase control is executed normally. This may reduce the chance of determining the heating control as normal.

When the heating control is determined as normal a plurality of times, the determination result is sufficiently reliable. This means that a previous abnormality determination may be updated to a normality determination if the value of the normal case counter TC is greater than or equal to a predetermined value, even when the abnormality-determined case drive command value ISCf and the second-diagnosis drive command value ISCt are not equal. When the drive command value of the ISC valve 61 is variably set, an abnormality may appear in the heating control depending on the setting of the drive command value as described above. An abnormality may not appear in the heating control when a specific drive command value is set. Then, an abnormality may appear in the heating control when a drive command value different from the specific drive command value is set. In view of this, the controller 50 executes the processing in S206. Thus, the controller 50 diagnoses the heating control as not having an abnormality with a high reliability.

When the value of the normal case counter TC is determined as being greater than or equal to the normal case determination value C ("YES" in S200), the controller 50 has determined a plurality of times that the intake air amount increasing processing is executed normally. Thus, the controller 50 finally determines that the heating control is being executed normally, that is, the heating control does not have an abnormality (S170).

An abnormality in the heating control may be reflected or may not be reflected as the value of the total intake air amount TGA, depending on the operation status of the engine in the diagnosis process. The determination result as not having an abnormality, which is obtained only once, may be insufficient to finally determine the heating control as not having an abnormality. In view of this, the controller 50 executes the processing in S200. With this processing, the controller 50 finally determines the heating control as not having an abnormality after determining the heating control as not having an abnormality a plurality of times. Thus, the diagnosis result as not having an abnormality is highly reliable.

When the value of the normal case counter TC is determined as below the normal case determination value C ("NO" in S200), the diagnosis process is temporarily terminated.

As described above, with the processing in S160 or S200 resulting in an affirmative determination, the controller 50 finally determines that the heating control is executed normally (S170). Next, as post-processing for a normality-determined case, the controller 50 clears the abnormality-determined case drive command value ISCf (S180), and executes a post-diagnosis process (S190). In the post-diagnosis process, the controller 50 executes, for example, the processing of (b1) to (b3).

(b1) The diagnosis condition satisfaction time TM is cleared.

(b2) The total intake air amount TGA is cleared.

(b3) The total low-speed time LT is cleared.

The diagnosis process is temporarily terminated.

When the total intake air amount TGA is determined as being less than the total air amount determination value A by the processing in S140 ("NO" in S140), an abnormality in the intake air amount increase control may have caused an insufficient increase in the intake air amount GA. In this case, the catalytic device 30 may not be sufficiently heated. The controller 50 determines whether the total low-speed time LT is greater than or equal to the total time determination value B (S210 in FIG. 4). In the first embodiment, the total time determination value B is set at eight seconds. However, the total time determination value B may be set at another value.

If the engine speed is maintained low during the idle operation at execution of the heating control, the intake air amount decreases, and the amount of exhaust supplied to the catalytic device 30 also decreases. As a result, the heating speed of the catalytic device 30 is lowered. The controller 50 of the first embodiment diagnoses the heating control as having or not having an abnormality based on a result of the determination as to whether the total low-speed time LT is above the total time determination value B in the diagnosis-timing time DT, in addition to a result of the determination relating to the total intake air amount TGA. In this way, the controller 50 more accurately diagnoses the heating control as having or not having an abnormality.

When the total low-speed time LT is determined as being greater than or equal to the total time determination value B ("YES" in S210), the time where the idle speed INE is maintained below the threshold $\beta$ is long, the total intake air amount TGA is small, and the amount of exhaust supplied to the catalytic device 30 is small. In this case, the controller 50 determines that the heating control has an abnormality (S220).

Next, the controller 50 executes post-processing for an abnormality-determined case (S230). Here, the controller 50 executes, for example, the processing (c1) to (c4) described below.

(c1) The completion record of the ISC learning is cleared, and the ISC learning is executed again.

(c2) The speed of the ISC learning is required to be increased, and the update speed of the ISC learning is increased.

(c3) The drive command value ISCt set in the present diagnosis with a determination result as having an abnormality is stored as the abnormality-determined case drive command value ISCf in the RAM of the controller 50

(c4) The normal case counter TC is cleared to 0

Next, the post-diagnosis process described above is executed (S190), and the diagnosis process is temporarily terminated.

When the total low-speed time LT is determined as being less than the total time determination value B by the processing in S210 ("NO" in S210), the time where the idle speed INE is maintained below the threshold β is short, and the idle speed INE is increased. When the engine speed during the idle operation is maintained sufficiently high, the total intake air amount TGA in the above predetermined period during the idle operation is supposed to be increased. There should be no such case where the total intake air amount TGA in the predetermined period is less than the total air amount determination value A and the total low-speed time LT in the predetermined period is below the total time determination value B. In such a case, noise may have influenced detection signals of the sensors so that the total intake air amount TGA or the total low-speed time LT is calculated incorrectly. In view of this, when the processing in S210 results in a negative determination, the controller 50 suspends determination as to whether the heating control has an abnormality (S240). In this way, the controller 50 avoids an incorrect diagnosis based on an inappropriate value.

After that, the processing in S190 described above is executed so that the diagnosis condition satisfaction time TM, the total intake air amount TGA, and the total low-speed time LT are cleared. The diagnosis process is executed again.

Figure 7:
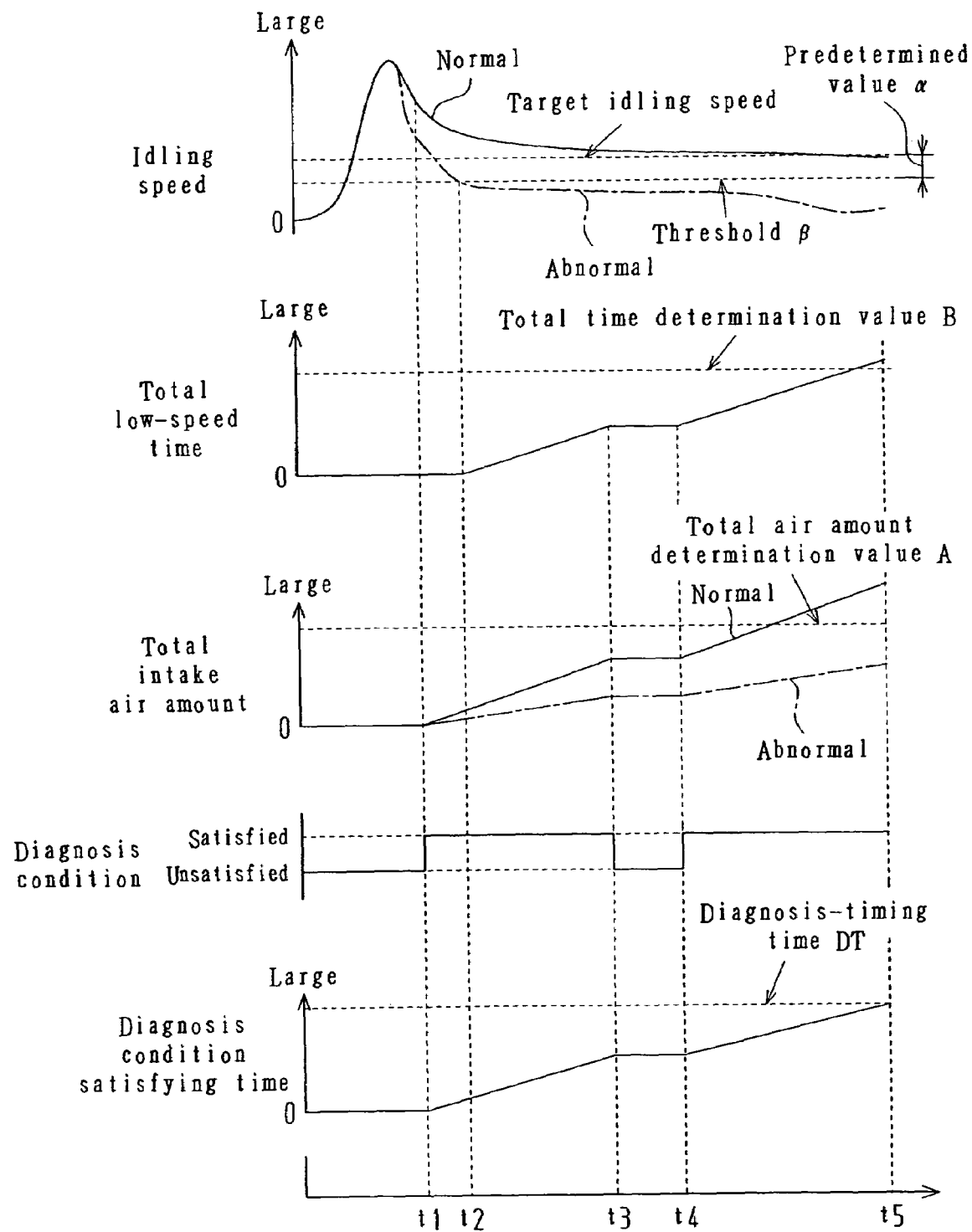
FIG. 7 is a timing chart exemplifying the chronological transition of an idle speed, a diagnosis condition status, a diagnosis condition satisfaction time, a total low-speed time, and a total intake air amount in the first embodiment.

FIG. 7 shows the chronological transition of the diagnosis condition satisfaction time TM, the total low-speed time LT, and the total intake air amount TGA when the diagnosis process is executed.

First, the gasoline engine 1 is started, and the diagnosis condition (conditions (a1) to (a10)) is satisfied (time t1). Then, the controller 50 starts calculating the diagnosis condition satisfaction time TM and the total intake air amount TGA. When the idle speed INE becomes less than or equal to the threshold β while the diagnosis condition is being satisfied (time t2 or thereafter), the controller 50 starts calculating the total low-speed time LT. After that, when the diagnosis condition is temporarily unsatisfied (time t3), the controller 50 suspends the processing for calculating the diagnosis condition satisfaction time TM, the total low-speed time LT, and the total intake air amount TGA. When the diagnosis condition is satisfied again (time t4), the controller 50 resumes the processing for calculating the diagnosis condition satisfaction time TM, the total low-speed time LT, and the total intake air amount TGA. When the diagnosis condition satisfaction time TM reaches the diagnosis-timing time DT (time t5), the controller 50 compares the total intake air amount TGA with the total air amount determination value A, and compares the total low-speed time LT with the total time determination value B, to diagnose the heating control as having or not having an abnormality.

Figure 8:
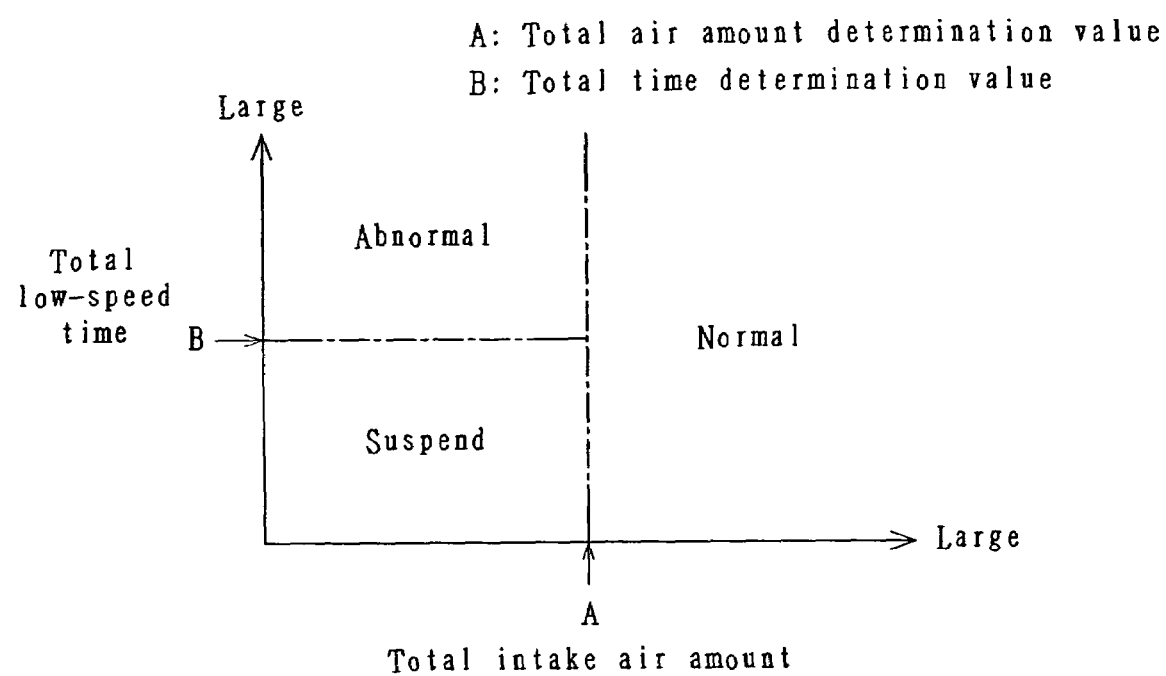
FIG. 8 is a conceptual diagram showing the determination status in the first embodiment.

The controller 50 diagnoses the heating control in the following way. As shown in FIG. 8, when the intake air amount is normally increased by the intake air amount increase control, that is, when the total intake air amount TGA is greater than or equal to the total air amount determination value A and the normal case counter TC is greater than or equal to the normal case determination value C, and such a state is detected a plurality of times, the controller 50 finally determines that the heating control does not have an abnormality.

The catalytic device 30 is heated by the heat of exhaust gas. Thus, even when the idle speed INE is low, the catalytic device 30 is sufficiently heated if the intake air amount GA is sufficiently increased. In the first embodiment, when determining that the intake air amount GA is sufficiently increased, the controller 50 determines that the heating control does not have an abnormality regardless of the total low-speed time LT.

Also, the controller 50 determines that the heating control does not have an abnormality when the total intake air amount TGA is greater than or equal to the total air amount determination value A, the intake air amount is normally increased by the intake air amount increase control, and the drive command value ISCt of the ISC valve 61 in this state and the abnormality-determined case drive command value ISCt are substantially equal.

When the total intake air amount TGA is below the total air amount determination value A and the total low-speed time LT is greater than or equal to the total time determination value B, that is, when the intake air amount GA is small and the engine speed NE is less than the threshold β, the controller 50 determines that the heating control has an abnormality.

When the total intake air amount TGA is less than the total air amount determination value A and the total low-speed time LT is below the total time determination value B, that is, when the intake air amount GA is small and the engine speed NE is above the threshold β, the controller 50 suspends determination as to whether the heating control has an abnormality.

As described above, the controller 50 for an internal combustion engine according to the first embodiment has the advantages described below.

(1) The total intake air amount in a predetermined period set in advance during the idle operation at execution of the heating control is an index value, which accurately reflects the degree of heating of the catalytic device 30 by the heating control. In the first embodiment, the controller 50 determines that the heating control has an abnormality when the total intake air amount TGA until the diagnosis condition satisfaction time TM reaches the diagnosis-timing time DT is below the total air amount determination value A. Thus, the controller 50 accurately diagnoses the heating control of the catalytic device 30 as having or not having an abnormality, which is caused by an insufficient increase in the intake air amount during the idle operation at execution of the heating control. In other words, the controller 50 accurately determines whether the catalytic device 30 is appropriately heated by the heating control.

(2) When the engine speed is kept low during idle at execution of the heating control, the intake air amount decreases, and the exhaust amount supplied to the catalytic device 30 also decreases. As a result, the heating speed of the catalytic device 30 is lowered. In the first embodiment, the controller 50 calculates the total low-speed time LT in the predetermined period, in addition to the total intake air amount TGA. The controller 50 diagnoses the heating control as having or not having an abnormality based further on a result of the determination as to whether the value of the total low-speed time LT is greater than the total time determination value B. Thus, the controller 50 more accurately diagnoses the heating control as having or not having an abnormality.

(3) Even when the engine speed is maintained low during idle at execution of the heating control, a sufficient amount of exhaust gas is supplied to the catalytic device 30 and the heating of the catalytic device 30 is sufficiently accelerated if the total intake air amount TGA in that period is sufficiently large. In the first embodiment, the controller 50 determines that the heating control does not have an abnormality when the total intake air amount TGA is greater than or equal to the total air amount determination value A regardless of whether the total low-speed time LT is above the total time determination value B. Thus, the controller 50 accurately diagnoses the heating control as having or not having an abnormality.

When the total intake air amount TGA in the predetermined period is below the total air amount determination value A and the total low-speed time LT in the predetermined period is greater than or equal to the total time determination value B, the amount of exhaust supplied to the catalytic device 30 is clearly small. In the first embodiment, the controller 50 determines that the heating control has an abnormality in such a case. In this way, the controller 50 accurately diagnoses the heating control as having or not having an abnormality.

When the engine speed is maintained sufficiently high during idle, the total intake air amount TGA in the predetermined period during idle operation is supposed to be increased. There should be no such case where the total intake air amount TGA in the predetermined period is less than the total air amount determination value A and the total low-speed time LT in the predetermined period is less than the total time determination value B. In the first embodiment, in such a case, the controller 50 suspends determination as to whether the heating control has an abnormality. In this way, the controller 50 avoids an incorrect diagnosis based on an inappropriate value.

(4) The target idle speed ITNE is variably set according to the engine status such as the engine coolant temperature. The threshold $\beta$ is set at a value obtained by subtracting the predetermined value $\alpha$ from the target idle speed ITNE. Thus, the controller 50 appropriately calculates the total low-speed time LT.

(5) When the catalytic device 30 is heated to a temperature close to its activation temperature, for example at warmed start, a delay in activation of the catalytic device 30 is small even if an increase in the intake air amount during idle at execution of the heating control is a little insufficient. Such an insufficient increase in the intake air amount has a relatively small influence on activation of the catalytic device 30. When the temperature of the catalytic device 30 is greatly less than the activation temperature, for example, at cold start, activation of the catalytic device 30 may be greatly delayed by an insufficient increase in the intake air amount. In this way, decelerated heating of the catalytic device 30, which is caused by an insufficient increase in the intake air amount during the idle operation at execution of the heating control, has a different influence on activation of the catalytic device 30 depending on the temperature status of the catalytic device 30. In the first embodiment, the predetermined value $\alpha$, which is used to calculate the threshold $\beta$, and the total air amount determination value A are variably set according to the temperature of the catalytic device 30. By changing the predetermined value $\alpha$ and the total air amount determination value A, the determination condition used in the diagnosis process is changed. Thus, the controller 50 accurately diagnoses the heating control as having or not having an abnormality according to the temperature status of the catalytic device 30.

To be specific, the controller 50 sets the predetermined value $\beta$ at a higher value as the temperature of the catalytic device 30 increases. The engine speed, which is associated with the total low-speed time LT, is lower as the temperature of the catalytic device 30 is higher. Thus, the chance of determining the heating control as having an abnormality is lower as the temperature of the catalytic device 30 is higher and an insufficient increase in the intake air amount has a smaller influence on a delay in activation of the catalytic device 30. Also, the controller 50 sets the total air amount determination value A at a smaller value as the temperature of the catalytic device 30 increases. Thus, the chance of determining the heating control as having an abnormality is smaller as the temperature of the catalytic device 30 increases.

The controller 50 estimates the temperature of the catalytic device 30, which is used to variably set the predetermined value $\alpha$ and the total air amount determination value A, based on the coolant temperature THW. The coolant temperature THW has a correlation with the temperature of the catalytic device 30. Thus, the controller 50 easily sets the predetermined value $\alpha$ and the total air amount determination value A.

(6) The controller 50 controls the ISC valve 61 according to a drive command value set based on the temperature of the catalytic device 30 that is estimated based on the coolant temperature THW.

In a first diagnosis with a specific drive command value being set, the heating control may be diagnosed as having an abnormality. Then, in a second diagnosis with a drive command value different from the specific drive command value being set, the heating control may be diagnosed as not having an abnormality. The abnormality determined in the first diagnosis may not necessarily have been eliminated at the time of the second diagnosis. The abnormality determined in the first diagnosis may depend on the drive command value of the ISC valve 61. In this case, even if the second diagnosis with the different drive command value diagnoses the heating control as not having an abnormality, a third diagnosis executed again with the specific drive command value may diagnose the heating control as having an abnormality again.

In the first embodiment, when the heating control is diagnosed as having an abnormality in a first diagnosis and as not having an abnormality in a second diagnosis, the controller 50 maintains the result of the first diagnosis as having an abnormality when the drive command value set in the first diagnosis greatly differs from the drive command value set in the second diagnosis. In other words, the controller 50 assumes that the abnormality determined in the first diagnosis has been eliminated only when the drive command value set in the second diagnosis is substantially equal to the drive command value set in the first diagnosis. In this way, the controller 50 avoids diagnosing the heating control as not having an abnormality when not recognizing whether an abnormality determined previously has been eliminated.

(7) An abnormality in the heating control may be reflected or may not be reflected as the value of the total intake air amount TGA, depending on the operation status of the engine in the diagnosis process. The determination result as not having an abnormality, which is obtained only once, may be insufficient to finally determine the heating control as not having an abnormality. In view of this, the controller 50 of the first embodiment finally determines the heating control as not having an abnormality after determining the heating control as not having an abnormality a plurality of times. Thus, the diagnosis result as not having an abnormality is highly reliable.

The drive command value of the ISC valve 61 is variably set according to the temperature of the catalytic device 30. Thus, an abnormality may appear in the heating control depending on the setting of the drive command value as described above. As described in item (6), an abnormality may not appear in the heating control when a specific drive command value is set, but an abnormality may appear in the heating control when a drive command value different from the specific drive command value is set. In such a case, too, the controller 50 of the first embodiment finally determines the heating control as not having an abnormality after determining the heating control as not having an abnormality a plurality of times. Thus, the controller 50 diagnoses the heating control as not having an abnormality with a high reliability.

(8) The controller 50 diagnoses the heating control after the ISC learning is completed. Thus, the diagnosis process is executed after the idle speed INE is adjusted to the target idle speed ITNE. To be specific, the controller 50 diagnoses the heating control after the idle speed INE is adjusted to such a value that is required to heat the catalytic device 30. This improves the accuracy of the diagnosis of the heating control.

When the idle speed INE fails to be adjusted because of a failure in the ISC valve 61, the ISC learning may not be completed, and the diagnosis of the heating control may not be executed. In view of this, the controller 50 of the first embodiment executes the diagnosis when a predetermined period has elapsed from when the ISC learning was started. Thus, the controller 50 executes the diagnosis even when the ISC learning is not completed. In such a case, an abnormality in the heating control is detected based on the total intake air amount TGA and/or the total low-speed time LT.

(9) When the drive command value ISCt corresponding to the difference ΔNE between the idle speed INE and the target idle speed ITNE fails to be calculated, that is, when an error occurs in learning of the drive command value ISCt, the idle speed INE fails to be adjusted to the target idle speed ITNE. In this case, the heating control may be erroneously diagnosed as having an abnormality. The controller 50 of the first embodiment executes the ISC learning again when the heating control is diagnosed as having an abnormality. Thus, such a learning error of the drive command value ISCt has a reduced influence on diagnosis results of the heating control, and the diagnosis results have improved reliability.

[Second Embodiment]

A controller 50 for an internal combustion engine according to a second embodiment of the present invention will now be described with reference to FIG. 9.

In the first embodiment, the controller 50 monitors the intake air amount and the engine speed when diagnosing the heating control as having or not having an abnormality. When the intake air amount is sufficiently increased, the exhaust amount increases and the heat amount received by the catalytic device 30 increases. Accordingly, heating of the catalytic device 30 is accelerated. In the second embodiment, the controller 50 monitors only the intake air amount to diagnose the heating control. Although being partially different, a diagnosis process in the second embodiment is basically the same as the diagnosis process in the first embodiment. The following describes the second embodiment focusing on its differences from the first embodiment.

Figure 9:
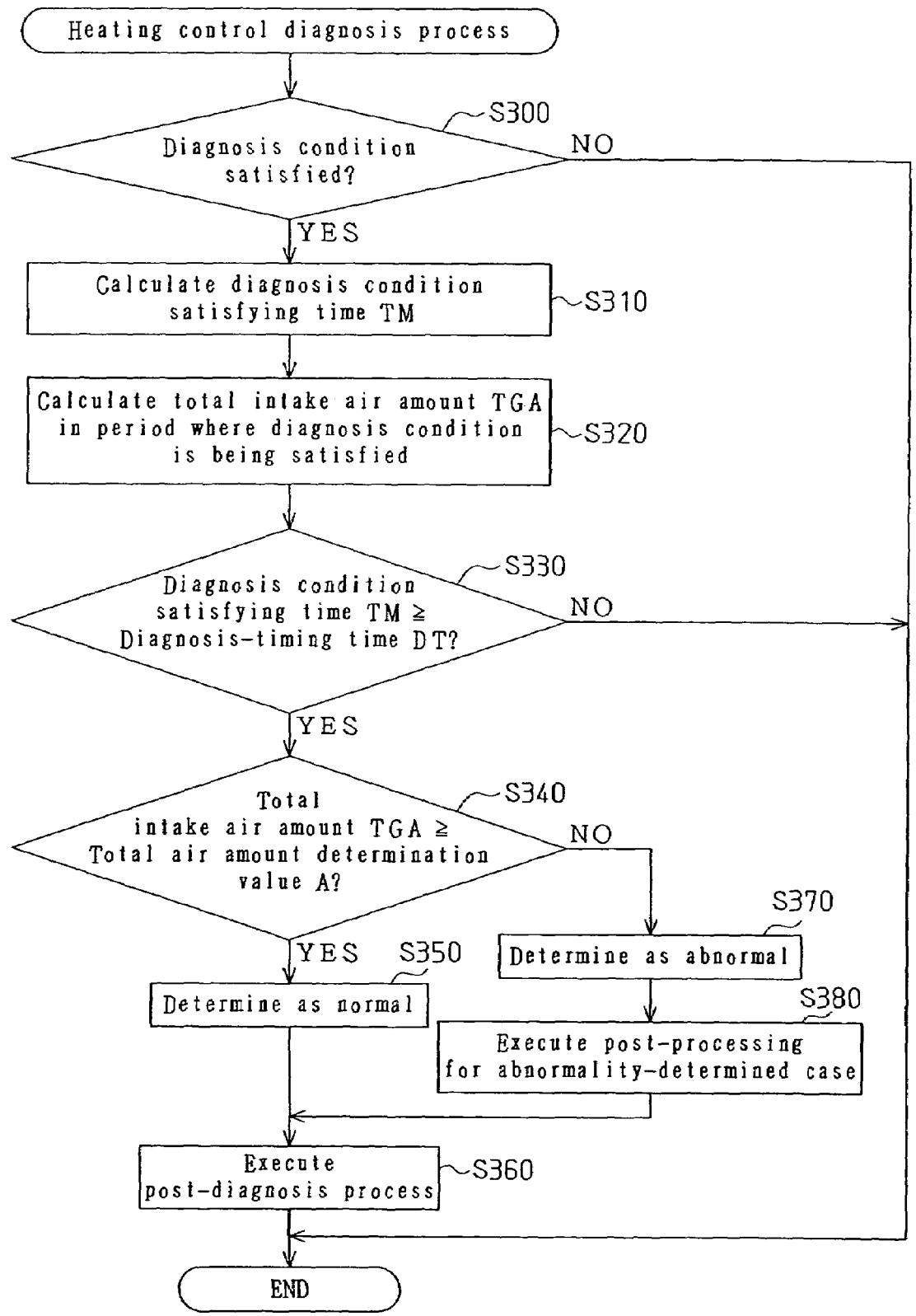
FIG. 9 is a flowchart showing a heating control diagnosis process according to a second embodiment of the present invention.

FIG. 9 shows the heating control diagnosis process executed by the controller 50 of the second embodiment.

When the diagnosis process is started, the controller 50 first determines whether the diagnosis condition is satisfied (S300). The processing in S300 is the same as the processing in S100.

When the diagnosis condition is not satisfied ("NO" in S300), the diagnosis process is temporarily terminated.

When the diagnosis condition is satisfied ("YES" in S300), the controller 50 starts calculating the diagnosis condition satisfaction time TM, which is the total time in which the diagnosis condition is being satisfied (S310). The processing in S310 is the same as the processing in S110.

Next, the controller 50 calculates the total intake air amount TGA during a period in which the diagnosis condition is being satisfied (S320). The total intake air amount TGA in the second embodiment is the same as the total intake air amount TGA in the first embodiment.

Next, the controller 50 determines whether the diagnosis condition satisfaction time TM reaches the diagnosis-timing time DT (S330). The processing in S330 is the same as the processing in S130. When the diagnosis condition satisfaction time TM is below the diagnosis-timing time DT ("NO" in S330), the diagnosis process is temporarily terminated, and the diagnosis condition satisfaction time TM continues being accumulated.

When the diagnosis condition satisfaction time TM is greater than or equal to the diagnosis-timing time DT ("YES" in S330), the controller 50 determines whether the total intake air amount TGA in the diagnosis-timing time DT is greater than or equal to the total air amount determination value A (S340). The processing in S340 is the same as the processing in S140.

When the total intake air amount TGA is determined as greater than or equal to the total air amount determination value A ("YES" in S340), the controller 50 determines that the intake air amount increase processing by the intake air amount increase control is executed normally, and determines that the heating control does not have an abnormality (S350).

Next, the controller 50 executes a post-diagnosis process (S360). The controller 50 executes, for example, the processing of (b1) and (b2) described below.

(b1) The diagnosis condition satisfaction time TM is cleared.

(b2) The total intake air amount TGA is cleared.

The diagnosis process is temporarily terminated.

When the total intake air amount TGA is determined as being less than the total air amount determination value A by the processing in S340 ("NO" in S340), the controller 50 determines that the intake air amount increase processing by the intake air amount increase control is not executed normally, that is, the heating control has an abnormality (S370).

Next, the controller 50 executes post-processing for an abnormality-determined case (S380). The controller 50 executes, for example, the processing of (c1) and (c2) described below.

(c1) The completion record of the ISC learning is cleared, and the ISC learning is executed again.

(c2) The speed of the ISC learning is required to be increased, and the update speed of the ISC learning is increased.

Next, the controller 50 executes the post-diagnosis process described above (S190). The diagnosis process is temporarily terminated.

The controller 50 of the second embodiment diagnoses the heating control as having or not having an abnormality by executing the diagnosis process described above. In this way, the controller 50 determines whether the catalytic device 30 is sufficiently heated.

The controller 50 for an internal combustion engine according to the second embodiment has the advantages described below.

(1) The total intake air amount in a predetermined period set in advance during the idle operation at execution of the heating control is an index value, which accurately reflects the degree of heating of the catalytic device 30 by the heating control. In the second embodiment, the controller 50 determines that the heating control has an abnormality when the total intake air amount TGA until the diagnosis condition satisfaction time TM reaches the diagnosis-timing time DT is below the total air amount determination value A. Thus, the controller 50 accurately diagnoses the heating control of the catalytic device 30 as having or not having an abnormality, which is caused by an insufficient increase in the intake air amount during the idle operation at execution of the heating control. In other words, the controller 50 accurately determines whether the catalytic device 30 is appropriately heated by the heating control.

(2) When the total intake air amount TGA during the idle operation at execution of the heating control is sufficiently large, a sufficient amount of exhaust gas is supplied to the catalytic device 30 and the heating of the catalytic device 30 is sufficiently accelerated. In the second embodiment, the controller 50 determines that the heating control does not have an abnormality when the total intake air amount TGA is greater than or equal to the total air amount determination value A. Thus, the controller 50 accurately diagnoses the heating control as having or not having an abnormality.

(3) As described above, decelerated heating of the catalytic device 30, which is caused by an insufficient increase in the intake air amount during the idle operation at execution of the heating control, has a different influence on activation of the catalytic device 30 depending on the temperature status of the catalytic device 30. In the second embodiment, the total air amount determination value A is variably set according to the temperature of the catalytic device 30. By changing the total air amount determination value A, the determination condition used in the diagnosis process is changed. Thus, the controller 50 accurately diagnoses the heating control as having or not having an abnormality according to the temperature status of the catalytic device 30.

To be specific, the controller 50 sets the total air amount determination value A at a smaller value as the temperature of the catalytic device 30 is higher. Thus, the chance of determining the heating control as having an abnormality is lower as the temperature of the catalytic device 30 increases.

The controller 50 estimates the temperature of the catalytic device 30, which is used to variably set the total air amount determination value A, based on the coolant temperature THW. The coolant temperature THW has a correlation with the temperature of the catalytic device 30. Thus, the controller 50 easily sets the total air amount determination value A.

(4) The controller 50 diagnoses the heating control after the ISC learning is completed. Thus, the diagnosis process is executed after the idle speed INE is adjusted to the target idle speed ITNE. To be specific, the controller 50 diagnoses the heating control after the idle speed INE is adjusted to such a value that is required to heat the catalytic device 30. This improves the accuracy of the diagnosis of the heating control.

When the idle speed INE fails to be adjusted because of a failure in the ISC valve 61, the ISC learning may not be completed, and the diagnosis of the heating control may not be executed. In view of this, the controller 50 of the second embodiment executes the diagnosis when a predetermined period has elapsed from when the ISC learning was started. Thus, the controller 50 executes the diagnosis even when the ISC learning is not completed. In such a case, an abnormality in the heating control is detected based on the total intake air amount TGA and/or the total low-speed time LT.

(5) When the drive command value ISCt corresponding to the difference ΔNE between the idle speed INE and the target idle speed ITNE fails to be calculated, when an error occurs in learning of the drive command value ISCt, the idle speed INE fails to be adjusted to the target idle speed ITNE. In this case, the heating control may be erroneously diagnosed as having an abnormality. The controller 50 of the second embodiment executes the ISC learning again when the heating control is diagnosed as having an abnormality. Thus, such a learning error of the drive command value ISCt has a reduced influence on the diagnosis result of the heating control, and the diagnosis result has an improved reliability.

(6) The diagnosis process in the second embodiment is simpler than the diagnosis process in the first embodiment. Thus, the controller 50 of the second embodiment diagnoses the heating control as having or not having an abnormality more easily.

It should be apparent to those skilled in the art that the present invention may be embodied in many other specific forms without departing from the spirit or scope of the invention. Particularly, it should be understood that the present invention may be embodied in the following forms.

Figure 4:
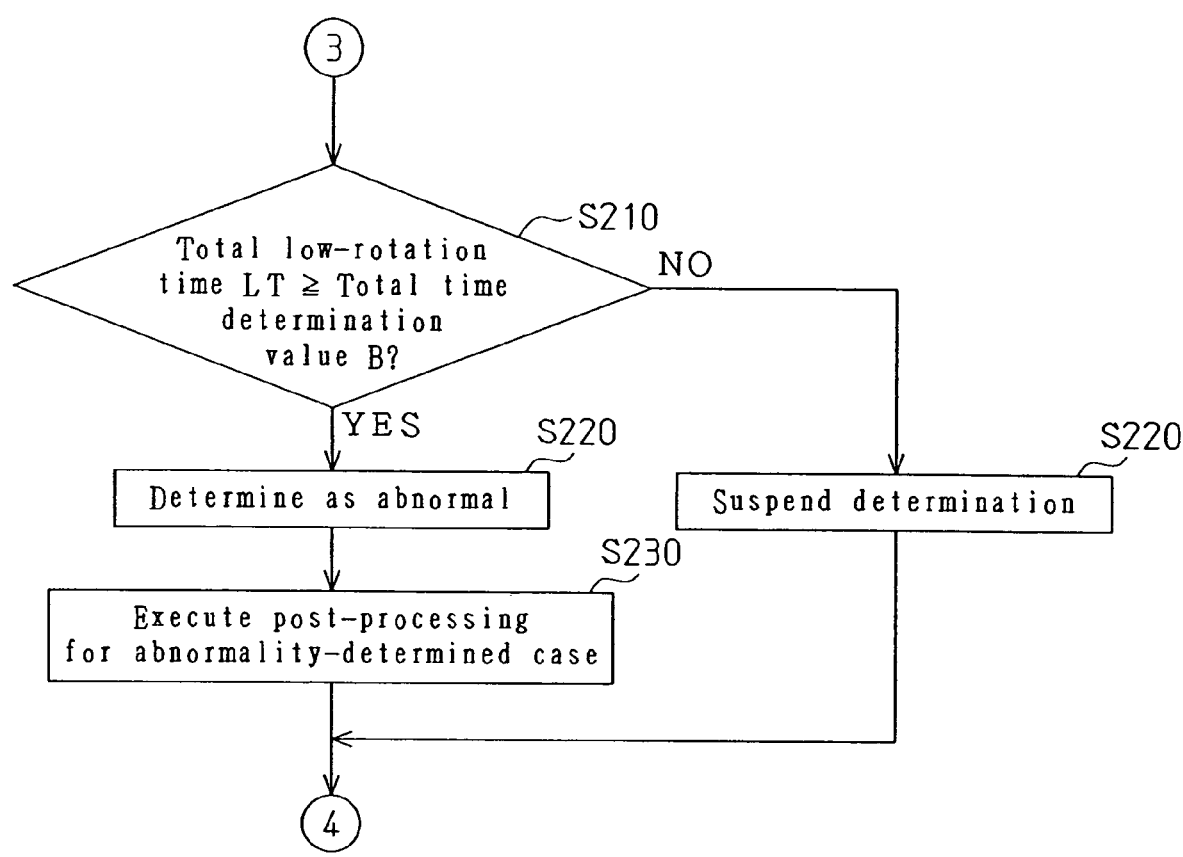
FIG. 4 is a flowchart showing the heating control diagnosis process executed by the controller of FIG. 1.

In the first embodiment, S150, S160, S180, and S200 in FIG. 3, and the processing (c3) and (c4) in S230 in FIG. 4 may not be executed.

In this case, the condition for determining the heating control as normal in the first embodiment is further simplified. To be specific, when the total intake air amount TGA is greater than or equal to the total air amount determination value A ("YES" in S140), the controller 50 immediately determines that the intake air amount increase control is normal. With this diagnosis process, too, the controller 50 accurately diagnoses the heating control as having or not having an abnormality.

In the first embodiment, S210 and S240 in FIG. 4, the processing for calculating the total low-speed time LT in S120 in FIG. 2, and the processing (b3) in S190 in FIG. 3 may not be executed.

In this case, the controller 50 diagnoses the heating control based on the total intake air amount TGA. When the total intake air amount TGA is less than the total air amount determination value A ("NO" in S140), the controller 50 immediately determines that the intake air amount increase control is abnormal. When the total intake air amount TGA is greater than or equal to the total air amount determination value A and the abnormality-determined case drive command value ISCf and the second-diagnosis drive command value ISCt are equal, or when the total intake air amount TGA is greater than or equal to the total air amount determination value A and the value of the normal case counter TC is greater than or equal to the normal case determination value C, the controller 50 determines that the heating control is normal. With this diagnosis process, the controller 50 also accurately diagnoses the heating control as having or not having an abnormality.

In the above embodiments, the controller 50 executes the idle control and the intake air amount increase control by adjusting the opening degree of the ISC valve 61. Alternatively, the controller 50 may execute the idle control and the intake air amount increase control by adjusting the opening degree of the throttle valve 23. In this case, the throttle valve 23 forms an intake air amount adjusting mechanism.

In the above embodiments, the predetermined value $\alpha$ is variably set based on the coolant temperature THW. Alternatively, the predetermined value $\alpha$ may be fixed.

Figure 10:
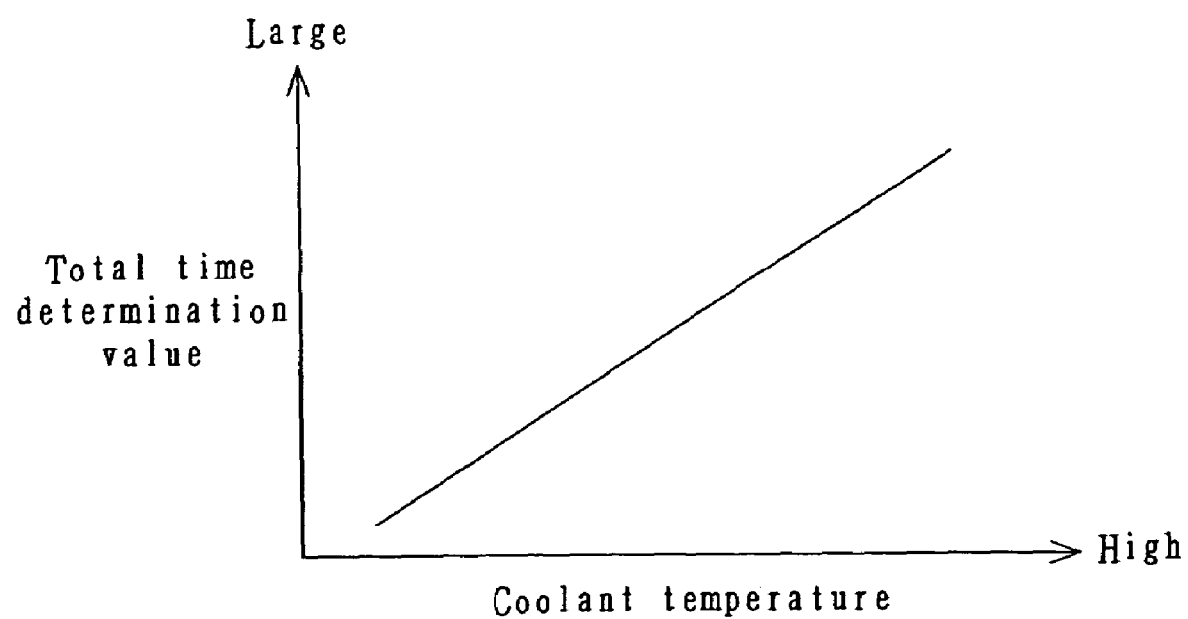
FIG. 10 is a graph exemplifying the setting of a total time determination value according to a modification of the present invention.

Even when the amount of heat received by the catalytic device 30 is reduced by a decrease in the exhaust amount supplied to the catalytic device 30, that is, even when, for example, the total low-speed time LT is long, it does not cause any problems if the temperature of the catalytic device 30 is high. To be specific, decelerated heating of the catalytic device, which is caused by an insufficient increase in the intake air amount during idle at execution of the heating control, has a different influence on activation of the catalytic device 30 depending on the temperature status of the catalytic device. Thus, the controller 50 may variably set the total time determination value B according to the temperature of the catalytic device 30 or the coolant temperature THW. To be specific, as exemplified in FIG. 10, the controller 50 may preferably set the total time determination value B at a higher value as the temperature of the catalytic device 30 is higher. In this case, the total time determination value B is set at such a value that considers the temperature of the catalytic device 30 and the amount of exhaust heat received by the catalytic device 30. In detail, the chance of determining the heating control as having an abnormality is lower as the temperature of the catalytic device 30 is higher and an insufficient increase in the intake air amount has a smaller influence on a delay in activation of the catalytic device 30. By changing the total time determination value B in this way, the determination condition used in the diagnosis process is changed. Thus, the controller 50 accurately diagnoses the heating control as having or not having an abnormality according to the temperature status of the catalytic device 30.

In the above embodiments, the controller 50 calculates the threshold $\beta$ as a value obtained by subtracting the predetermined value $\alpha$ from the target idle speed ITNE. Alternatively, the controller 50 may calculate the threshold $\beta$ as a value obtained by multiplying the target idle speed ITNE by a correction coefficient, which is appropriately set.

In the above embodiments, the threshold $\beta$ may be a variable value, which is directly obtained based on the coolant temperature THW. Alternatively, the threshold $\beta$ may be a fixed value.

In the above embodiments and modifications, the controller 50 uses the coolant temperature THW when variably setting the various values (the target idle speed ITNE, the basic drive command value ISCb, the predetermined value $\alpha$, the total air amount determination value A, the total time determination value B, the threshold $\beta$, etc.). This is because the warm-up status of the catalytic device 30, that is, the temperature of the catalytic device 30, is estimated based on the coolant temperature THW. Here, the temperature of the catalytic device 30 is higher as the engine-stopped time before start of the engine is shorter, or as the engine load is higher. The above various values may be set based on such various parameters, which have correlations with the temperature of the catalytic device 30. Alternatively, the above various values may be set based directly on the temperature of the catalytic device 30, which is detected by a temperature sensor.

In the above embodiments and modifications, the present invention is applied to the controller 50, which variably sets the target idle speed ITNE and the basic drive command value ISCb based on the coolant temperature THW. The present invention is also applicable to a controller that sets the target idle speed ITNE and the basic drive command value ISCb at fixed values.

The present examples and embodiments are to be considered as illustrative and not restrictive, and the invention is not to be limited to the details given herein, but may be modified within the scope and equivalence of the appended claims.

What is claimed is:

1. A controller for an internal combustion engine including a catalytic device, the controller comprising:
   heating control means for increasing speed of the engine during engine idle to accelerate heating of the catalytic device with exhaust gas discharged from the engine, and
   diagnosis means for obtaining a total air amount by adding up an amount of air that has been supplied to the engine in a predetermined period during execution of the heating control and determining that the heating control has an abnormality when the total air amount is less than an air amount determination value.

2. The controller according to claim 1, wherein the diagnosis means obtains a total low-speed time by adding up times in which the speed of the engine is less than or equal to a predetermined threshold in the predetermined period, and the diagnosis means determines whether the heating control has an abnormality based on whether the total low-speed time is greater than a total time determination value.

3. The controller according to claim 2, wherein the diagnosis means determines that the heating control does not have an abnormality when the total air amount is greater than or equal to the air amount determination value.

4. The controller according to claim 2, wherein the diagnosis means determines that the heating control has an abnormality when the total air amount is less than the air amount determination value and the total low-speed time is greater than or equal to the total time determination value.

5. The controller according to claim 2, wherein the diagnosis means suspends determination as to whether the heating control has an abnormality when the total air amount is less than the air amount determination value and the total low-speed time is less than the total time determination value.

6. The controller according to claim 2, wherein the diagnosis means calculates the predetermined threshold by subtracting a predetermined value from a target speed of the engine that is calculated based on engine status.

7. The controller according to claim 6, wherein the diagnosis means variably sets the predetermined value according to the temperature of the catalytic device.

8. The controller according to claim 7, wherein the diagnosis means sets the predetermined value at a larger value as the temperature of the catalytic device increases.

9. The controller according to claim 2, wherein the diagnosis means variably sets the total time determination value according to the temperature of the catalytic device.

10. The controller according to claim 9, wherein the diagnosis means sets the total time determination value at a larger value as the temperature of the catalytic device increases.

11. The controller according to claim 2, further comprising:
   setting means for setting a drive command value according to the temperature of the catalytic device, the drive command value being used to adjust the amount of air that is to be supplied to the engine,
   wherein the diagnosis means determines whether the heating control has an abnormality a plurality of times, and maintains a previous result of determining that the heating control has an abnormality when a difference between a previous drive command value and a present drive command value is greater than or equal to a predetermined value, the previous drive command value being a value set when the heating control was previously determined as having an abnormality, the present drive command value being a value set when the heating control is presently determined as not having an abnormality.

12. The controller according to claim 1, wherein the diagnosis means variably sets the air amount determination value according to the temperature of the catalytic device.

13. The controller according to claim 12, wherein the diagnosis means sets the air amount determination value at a smaller value as the temperature of the catalytic device increases.

14. The controller according to claim 7, wherein the diagnosis means estimates the temperature of the catalytic device based on the temperature of coolant used to cool the internal combustion engine.

15. The controller according to claim 1, wherein the diagnosis means finally determines that the heating control does not have an abnormality when determining that the heating control does not have an abnormality a plurality of times.

16. The controller according to claim 1, further comprising:
   learning means for calculating a drive command value based on a difference between present speed of the engine during engine idle and a target speed, the drive command value being used to adjust the amount of air that is to be supplied to the engine.

17. The controller according to claim 16, wherein the diagnosis means determines whether the heating control has an abnormality after the learning means completes calculation of the drive command value.

18. The controller according to claim 16, wherein the diagnosis means determines whether the heating control has an abnormality when a predetermined time has elapsed from when the learning means started calculation of the drive command value.

19. The controller according to claim 16, wherein the learning means calculates the drive command value again when the diagnosis means determines that the heating control has an abnormality.

20. A control apparatus for an internal combustion engine including a catalytic device, the control apparatus comprising:
   a controller for increasing speed of the engine during engine idle to accelerate heating of the catalytic device with exhaust gas discharged from the engine, wherein the controller obtains a total air amount by adding up an amount of air that has been supplied to the engine in a predetermined period during execution of the heating control and determines that the heating control has an abnormality when the total air amount is less than an air amount determination value.

21. A controller for an internal combustion engine that executes heating control for increasing speed of the engine during engine idle to accelerate heating of a catalytic device with exhaust gas discharged from the engine, the controller comprising:
   a sensor that detects air being supplied to the engine; and
   diagnosis means in communication with the sensor, the diagnosis means being for obtaining a total air amount by adding up the amount of air that has been supplied to the engine in a predetermined period during execution of the heating control and determining that the heating control has an abnormality when the total air amount is less than an air amount determination value.

22. A control apparatus for an internal combustion engine that executes heating control for increasing speed of the engine during engine idle to accelerate heating of a catalytic device with exhaust gas discharged from the engine, the control apparatus comprising:
   a sensor that detects air being supplied to the engine; and
   a controller in communication with the sensor, the controller being for obtaining a total air amount by adding up the amount of air that has been supplied to the engine in a predetermined period during execution of the heating control and determining that the heating control has an abnormality when the total air amount is less than an air amount determination value.

23. A method for diagnosing heating control that increases speed of an internal combustion engine during engine idle and accelerates heating of a catalytic device with exhaust gas discharged from the engine, the method comprising:
   obtaining a total air amount by adding up an amount of air that has been supplied to the engine in a predetermined period during execution of the heating control; and
   comparing the total air amount with an air amount determination value and determining that the heating control has an abnormality when the total air amount is less than the air amount determination value.

24. The method according to claim 23, further comprising:
   obtaining a total low-speed time by adding up a time in which the speed of the engine is less than or equal to a predetermined threshold in the predetermined period; and
   comparing the total low-speed time with a total time determination value and determining that the heating control has an abnormality when the total air amount is less than the air amount determination value and the total low-speed time is greater than or equal to the total time determination value.

25. The method according to claim 24, further comprising:
   suspending determination as to whether the heating control has an abnormality when the total air amount is less than the air amount determination value and the total low-speed time is less than the total time determination value.

26. The method according to claim 23, further comprising:
   setting the air amount determination value at a smaller value as the temperature of the catalytic device increases.

* * * * *